United States Patent
Wang (10) Patent No.: US 9,112,828 B2
(45) Date of Patent: Aug. 18, 2015

(54) METHOD FOR DEFENDING AGAINST SESSION HIJACKING ATTACKS AND FIREWALL

(71) Applicant: Sangfor Technologies Company Limited, Shenzhen, Guangdong (CN)

(72) Inventor: Pengtao Wang, Shenzhen (CN)

(73) Assignee: Sangfor Technologies Company Limited, Shenzhen (CN)

( * ) Notice: Subject to any disclaimer, the term of this patent is extended or adjusted under 35 U.S.C. 154(b) by 0 days.

(21) Appl. No.: 14/086,983

(22) Filed: Nov. 22, 2013

(65) Prior Publication Data

US 2014/0189842 A1   Jul. 3, 2014

(30) Foreign Application Priority Data

Dec. 27, 2012   (CN) .......................... 2012 1 0579537

(51) Int. Cl.
H04L 29/06   (2006.01)
(52) U.S. Cl.
CPC ............ *H04L 63/02* (2013.01); *H04L 63/0807* (2013.01); *H04L 63/0884* (2013.01); *H04L 63/1466* (2013.01)
(58) Field of Classification Search
CPC .............................. H04L 63/08; H04L 9/3212

USPC ......................................................... 726/7, 9
See application file for complete search history.

(56) References Cited

U.S. PATENT DOCUMENTS 7,339,908 B2 *   3/2008   Uhlik et al. .................... 370/331
2012/0167190 A1 *   6/2012   Tie et al. ............................ 726/7

OTHER PUBLICATIONS

"RequestRodeo: Client side protection against session riding"; M Johns et al; Proceedings of the OWASP Europe 2006 Conference, 2006.*
"Session table architecture for defending SYN flood attack"; X Li et al; p. 220-230, Springer-Verlag; Information and Communications Security, 2005.*

* cited by examiner

Primary Examiner — Jason Lee (57) ABSTRACT

The present disclosure provides a method for defending against session hijacking attacks, including: receiving a first access request transmitted from a legal client side and transmitting the first access request to a server; receiving a first response comprising a first authentication token returned from the server; generating a first sequence value according to a network address of the legal client side and an identification code of the legal client side, and recombining the first authentication token and the first sequence value to form a second authentication token; and replacing the first authentication token in the first response with the second authentication token, and transmitting the first response comprising the second authentication token to the legal client side.

8 Claims, 5 Drawing Sheets

METHOD FOR DEFENDING AGAINST SESSION HIJACKING ATTACKS AND FIREWALL

CROSS-REFERENCE TO RELATED APPLICATIONS

This present application claims the benefit of Chinese Patent Application No. 201210579537.9 filed on Dec. 27, 2012; the contents of which are hereby incorporated by reference.

BACKGROUND

1. Technical Field

The present disclosure relates to technologies of network telecommunications, and particularly, to a method for defending against session hijacking attacks and a firewall.

2. Description of Related Art

HTTP protocol is stateless and is not provided with a mechanism of connecting different kinds of requests/responses submitted by a user. Each of the requests/responses is an independent affair. In order to provide stateful HTTP, WEB applications need to dynamically interact with the user to maintain interaction state data between HTTP and a legal client side. The dynamic interaction process is called session. At first, the state data is transmitted to the legal client side for storage and then is returned for validation together with the request submitted by the legal client side. The state saving mechanism is based on the premise that the legal client side is authenticated such that the integrity and confidentiality of the state data can be ensured. However, in practical application, an attacker may steal state information through a session hijacking loophole to achieve an illegal access by personating as other authenticated clients. During the login authentication process, after a user name and a password inputted by the user have been validated, the application returns the state information to the legal client side. The state information is returned with the next request from the user, and the application validates the identification of the user according to the information and further returns a correct response page. If the state information is hijacked by the attacker in some way, the attacker may bypass the authorization to perform the illegal assess by personating as other clients. The process of hijacking the state information is called session hijacking. There are more than ten ways that can be used for realizing the session hijacking attack, generally including XSS (also known as CSS, Cross Site Script) session hijacking, CSRF (Cross-site Request Forgery) session hijacking, fixed session attack, session token guessing, session token brute force, log-leaked token, and etc. Currently, an application layer firewall is used as a defense against one kind of the session hijackings mentioned above, such as the XSS session hijacking based on characteristics and the CSRF session hijacking based on tokens. However, defenses based on characteristics are passive defenses which cannot defend against session hijackings beforehand and may cause false reports and missing reports easily. On the other hand, defenses based on tokens have disadvantages including singularity and time dependency. Additionally, if the firewall is configured to defend against one kind of the session hijacking attacks, the session still can be hijacked via other kinds of session hijacking attacks and the firewall still cannot defend against the new kind of session hijacking attack.

SUMMARY

The main object of the present disclosure is to provide a comprehensive and effective method and firewall for defending against session hijacking attacks.

The method for defending against session hijacking attacks provided in the present disclosure includes:

receiving a first access request transmitted from a legal client side and transmitting the first access request to a server;

receiving a first response including a first authentication token returned from the server;

generating a first sequence value according to a network address of the legal client side and an identification code of the legal client side, and recombining the first authentication token and the first sequence value to form a second authentication token; and replacing the first authentication token in the first response with the second authentication token, and transmitting the first response including the second authentication token to the legal client side.

Preferably, the method for defending against session hijacking attacks further includes a step after the step of transmitting the first response including the second authentication token to the legal client side:

receiving a second access request including the second authentication token transmitted from a current client side;

separating the first authentication token and the first sequence value from the second authentication token;

generating a second sequence value according to a network address of the current client side and an identification code of the current client side;

determining that the current client side is the legal client side if the second sequence value is the same as the first sequence value;

replacing the second authentication token in the second access request with the first authentication token; and transmitting the second access request including the first authentication token to the server such that the server can validate the first authentication token and respond to the second access request.

Preferably, the step of generating a first sequence value according to a network address of the legal client side and an identification code of the legal client side includes:

generating the first sequence value from the network address of the legal client side and the identification code of the legal client side using a random string and Hash algorithm.

Preferably, the step of generating a second sequence value according to a network address of the current client side and an identification code of the current client side includes:

generating the second sequence value from the network address of the current client side and the identification code of the current client side using the same random string and Hash algorithm used for generating the first sequence value.

Preferably, the method for defending against session hijacking attacks further includes the following step before the step of receiving a first access request transmitted from a legal client side:

searching a page relying on a token for access in the server;

obtaining Cookie data in multiple access requests and Set-Cookie data in multiple responses in a predetermined time;

obtaining a key-value pair of each of the Cookie data and a key-value pair of each of the Set-Cookie data;

generating a corresponding third access request according to each of the key-value pair and each combination of the corresponding key-value pair;

accessing the page using each of the third access request respectively;

receiving a third response returned from the page corresponding to each of the third access request; and if the third response is valid, determining that the key-value pair corresponding to the valid third response corresponds to a position where the first authentication token is stored.

The present disclosure further provides a firewall for defending against session hijacking attacks including one or more programs stored in a storage system and executed by at least one processor. The one or more programs include:

a transceiver module configured for receiving a first access request transmitted from a legal client side, transmitting the first access request to a server, and receiving a first response including a first authentication token returned from the server;

a recombining module configured for generating a first sequence value according to a network address of the legal client side and an identification code of the legal client side and recombining the first authentication token and the first sequence value; and a replacing module configured for replacing the first authentication token in the first response with the second authentication token; and the transceiver module being further configured for transmitting the first response including the second authentication token to the legal client side.

Preferably, the firewall for defending session hijacking attacks further includes a judging module;

the transceiver module is further configured for receiving a second access request including the second authentication token transmitted from a current client side;

the recombining module is further configured for separating the first authentication token and the first sequence value from the second authentication token and generating a second sequence value according to a network address of the current client side and an identification code of the current client side;

the judging module is configured for determining that the current client side is the legal client side if the second sequence value is the same as the first sequence value;

the replacing module is further configured for replacing the second authentication token in the second access request with the first authentication token; and the transceiver module is further configured for transmitting the second access request including the first authentication token to the server such that the sever can validate the first authentication token and respond to the second access request.

Preferably, the recombining module is configured for generating the first sequence value from the network address of the legal client side and the identification code of the legal client side using a random string and Hash algorithm.

Preferably, the recombining module is further configured for generating the second sequence value from the network address of the current client side and the identification code of the current client side using the same random string and Hash algorithm used for generating the first sequence value.

Preferably, the firewall for defending against session hijacking attacks further includes a searching module for searching a page relying on a token for access in the server;

the recombining module is configured for obtaining Cookie data in multiple access requests and Set-Cookie data in multiple responses in a predetermined time, obtaining a key-value pair of each of the Cookie data and a key-value pair of each of the Set-Cookie data, and generating a corresponding third access request according to each of the key-value pair and each combination of the corresponding key-value pair;

the transceiver module is further configured for accessing the page using each of the third access request respectively and receiving a third response returned from the page corresponding to each of the third access request; and the judging module is further configured for judging whether the third response is valid and determining that the key-value pair corresponding to the valid third response corresponds to a position where the first authentication token is stored.

With the mechanism for validating the identification of the client side of the present disclosure, an illegal client side is prevented from accessing the server by personating as the legal client side, which effectively defends against various kinds of session hijacking attacks and avoids false reports or missing reports even if the token is changed, and thereby providing a more comprehensive and reliable defense against session hijacking attacks.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
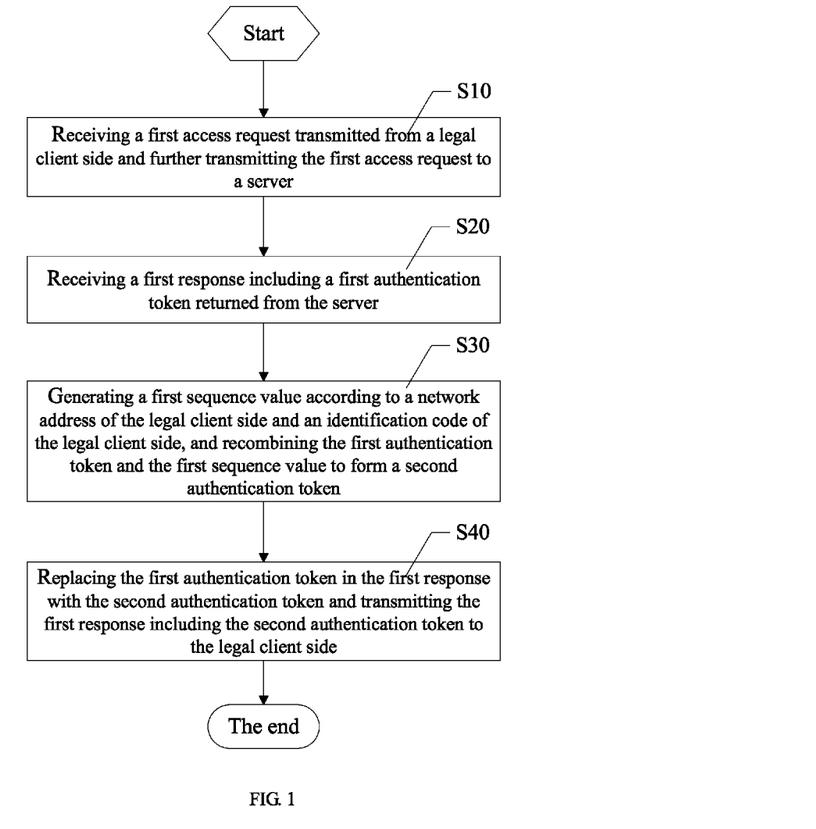
FIG. 1 is a flow chart of a method for defending against session hijacking attacks in accordance with a first embodiment of the present disclosure.

Referring to FIG. 1, which is a flow chart of a method for defending against session hijacking attacks in accordance with a first embodiment of the present disclosure. The method provided in the embodiment includes the following steps.

Step S10, receiving a first access request transmitted from a legal client side and further transmitting the first access request to a server.

When the legal client side accesses the server for the first time, an access request (that is, the first access request in the step S10) transmitted from the legal client side does not include a token, at this time, a firewall directly releases the access request.

Step S20, receiving a first response including a first authentication token returned from the server.

The server responds to the access request after receiving the access request and returns a response (that is, the first response including the first authentication token in the step S20) including an authentication token.

Step S30, generating a first sequence value according to a network address of the legal client side and an identification code of the legal client side, and recombining the first authentication token and the first sequence value to form a second authentication token.

In the step of recombining the authentication token of Step S30, the identification code of the legal client side can be a physical address of the legal client side or other collectable information of the legal client side. The first sequence value can be generated from the network address and the identification code of the legal client side using a random string and Hash algorithm.

Step S40, replacing the first authentication token in the first response with the second authentication token and transmitting the first response including the second authentication token to the legal client side.

The firewall transmits the replaced response to the legal client side. The legal client side stores the second authentication token in the response such that the legal client side can provide the second authentication token to the server for validation when re-accessing the server. Since at this time the second authentication token includes the information of the legal client side, thus, when a client side initiates a request of accessing the server, the information of the legal client side included in the second authentication token is compared with the information of the client side that is currently initiating the access request. If the information of the legal client side included in the second authentication token matches with the information of the client side that is currently initiating the access request, the client side that is currently initiating the access request is the legal client side which legally obtains the second authentication token in the step S40; otherwise, the client side that is currently initiating the access request is an illegal client side and the firewall denies the release thereof.

With the validation mechanism of the identification of the client side of the embodiment, an illegal client side can be prevented from accessing the server by personating as the legal client side. This effectively defends against various kinds of session hijacking attacks and avoids false reports or missing reports even if the token is changed, and thereby providing a more comprehensive and reliable defense against session hijacking attacks.

Figure 2:
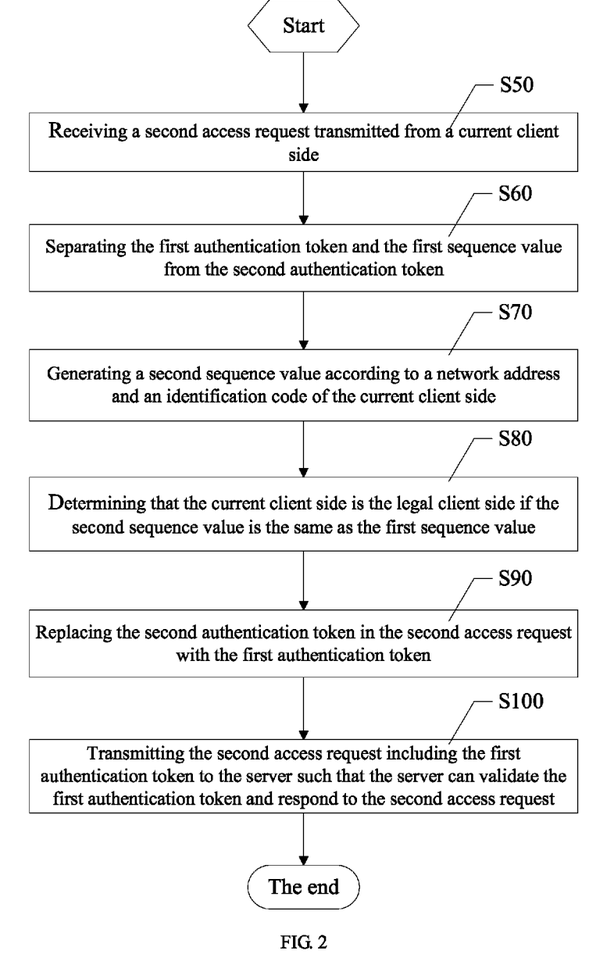
FIG. 2 is a flow chart of a method for defending against session hijacking attacks in accordance with a second embodiment of the present disclosure.

Referring to FIG. 2, which is a flow chart of a method for defending against session hijacking attacks in accordance with a second embodiment of the present disclosure. Based on the method of the embodiment shown in FIG. 1, the method of the second embodiment further includes the following steps after the step S40.

Step S50, receiving a second access request transmitted from a current client side.

The current client side that transmits the second access request may be the legal client side initiating an access request again or an illegal client side stealing the token, thus, the second access request includes the second authentication token.

Step S60, separating the first authentication token and the first sequence value from the second authentication token.

The second authentication token can be separated into two parts, a part of which is the same as the first authentication token and the other part is the same as the first sequence value. The two parts can be used as the identification of the client side.

Step S70, generating a second sequence value according to a network address and an identification code of the current client side.

The firewall obtains the information of the current client side and generates the second sequence value for validating whether the current client side is legal or not. The second sequence value can be generated in the same way as the first sequence value. The second sequence value can be generated from the network address and the identification code of the current client side using the same random string and Hash algorithm used for generating the first sequence value.

Step S80, determining that the current client side is the legal client side if the second sequence value is the same as the first sequence value.

If the current client side is the legal client side that initiates the access request again, the information of the current client side is the same as that of the legal client side, and the generated second sequence value is also the same as the first sequence value. If the current client side is an illegal client side that steals the token, the information of the illegal client side is apparently different from that of the legal client side, and the generated second sequence value is also different from the first sequence value. Thus, whether the current client side is legal or not can be determined through the step.

Step S90, replacing the second authentication token in the second access request with the first authentication token.

After the firewall determines that the current client side is the legal client side, the second authentication token is restored to be the first authentication token and is further transmitted to the server for validation.

Step S100, transmitting the second access request including the first authentication token to the server such that the server can validate the first authentication token and respond to the second access request.

With the validation of the identification of the client side, the firewall releases the current client side if the information of the current client side is the same as that of the legal client side, which effectively defends against various kinds of session hijacking attacks and avoids false reports or missing reports even if the token is changed, and thereby providing a more comprehensive and reliable defense.

Figure 3:
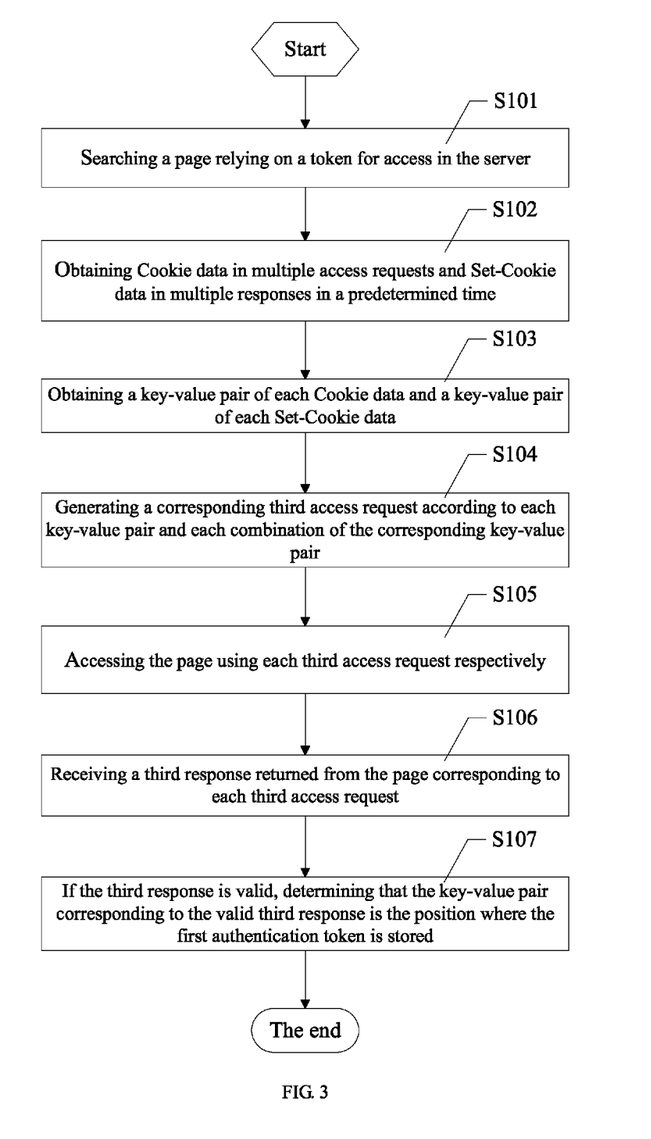
FIG. 3 is a flow chart of a method for defending against session hijacking attacks in accordance with a third embodiment of the present disclosure.

Referring to FIG. 3, which is a flow chart of a method for defending against session hijacking attacks in accordance with a third embodiment of the present disclosure. Based on the method of the embodiment shown in FIG. 2, a step of searching the position of the token is added. The method of the third embodiment further includes the following steps before step S10.

Step S101, searching a page relying on a token for access in the server.

Searching a page relying on a token for access means searching a page which can only be accessed after the login authentication is passed. The page relaying on a token for access can be determined via a configuration interface provided to a manager, or can be determined via a scanning function of the firewall before deploying the firewall, or can be determined by detecting the login request and response in real time. In the embodiment, the page can be determined by detecting the login request and response in real time.

Step S102, obtaining Cookie data in multiple access requests and Set-Cookie data in multiple responses in a predetermined time.

After the firewall is deployed, in an enough long predetermined time, all received requests messages and all received response messages are detected to obtain as many as samples as possible, for example, to obtain the samples from the Cookie data of request headers or from the Set-Cookie data of response headers.

Step S103, obtaining a key-value pair of each Cookie data and a key-value pair of each Set-Cookie data.

Step S104, generating a corresponding third access request according to each key-value pair and each combination of the corresponding key-value pair.

A part of the key-value pairs or all of the key-value pairs of the Cookie data and the Set-Cookie data are obtained. When the third access request message is generated, the header of the Cookie message of the third access request message is modified to be one of the key-value pairs or one of the combinations of the corresponding key-value pair, that is, a user-defined access request, until all the combinations of the corresponding key-value pair are traversed.

Step S105, accessing the page using each third access request respectively.

Step S106, receiving a third response returned from the page corresponding to each third access request.

Step S107, if the third response is valid, determining that the key-value pair corresponding to the valid third response is the position where the first authentication token is stored.

The firewall judges whether a token is included in the Cookie of the transmitted third access request or not according to the response of the server, based on distinguishable indexes such as a length of the message or a key word, etc. If the length of the message is equal to that of the correctly responded page, it means that a token is included in the key-value pair of the Cookie or the combination of the corresponding key-value pair in the third access request, and thus the corresponding key-value pair or the corresponding combination is recorded. If there are multiple valid positions, the simplest one is searched in order to determine a simplest position for storing the session token. In the present disclosure, the storing position of the token is determined by a self-learning function of the firewall, allowing the authentication token to be obtained accurately in the access request and avoiding the situation where that the token is obtained by mistake.

Figure 4:
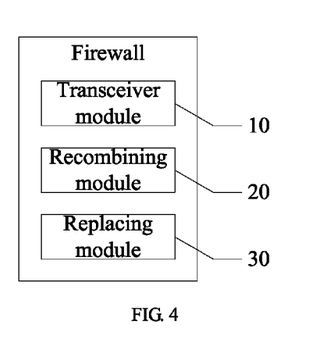
FIG. 4 is a schematic view of a firewall for defending against session hijacking attacks in accordance with a first embodiment of the present disclosure.

The present disclosure further provides a firewall for defending against session hijacking attacks. As shown in FIG. 4, which is a schematic view of a schematic view of a firewall for defending against session hijacking attacks in accordance with a first embodiment of the present disclosure, the firewall includes a transceiver module 10, a recombining module 20, and a replacing module 30. The modules 10-30 may comprise computerized instructions in the form of one or more programs that are stored in a storage system and executed by at least one processor to provide functions for implementing the modules. In general, the word "module", as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, flash memory, and hard disk drives. A detailed description of each module will be given.

The transceiver module 10 is configured for receiving a first access request transmitted from a legal client side, transmitting the first access request to a server, and receiving a first response including a first authentication token returned from the server.

The recombining module 20 is configured for generating a first sequence value according to a network address and an identification code of the legal client side and recombining the first authentication token and the first sequence value to form a second authentication token.

The replacing module 30 is configured for replacing the first authentication token in the first response with the second authentication token.

The transceiver module 10 is further configured for generating the first sequence value from the network address and the identification code of the legal client side using a random string and Hash algorithm.

In the embodiment, when the legal client side accesses the server for the first time, an access request transmitted from the legal client side does not include a token, at this time, and a firewall directly releases the access request. The server responds to the access request after receiving the access request and returns a response including an authentication token. The identification code of the legal client side can be a physical address of the legal client side or other collectable information of the legal client side. The first sequence value can be generated from the network address and the identification code of the legal client side using a random string and Hash algorithm. The firewall transmits the replaced response to the legal client side. The legal client side stores the second authentication token in the response such that the legal client side can provide the second authentication token to the server for validation when re-accessing the server. Since at this time the second authentication token includes the information of the legal client side, thus, when a client side initiates a request of accessing the server, the information of the legal client side included in the second authentication token is compared with the information of the client side that is currently initiating the access request. If the information of the legal client side included in the second authentication token matches with the information of the client side that is currently initiating the access request, the client side that is currently initiating the access request is the legal client side which legally obtains the second authentication token; otherwise, the client side that is currently initiating the access request is an illegal client side and the firewall denies the release thereof.

With the mechanism for validating the identification of the client side of the embodiment, an illegal client side can be prevented from accessing the server by personating as the legal client side. This effectively defends against various kinds of session hijacking attacks and avoids false reports or missing reports even if the token is changed, and thereby providing a more comprehensive and reliable defense against session hijacking attacks.

Figure 5:
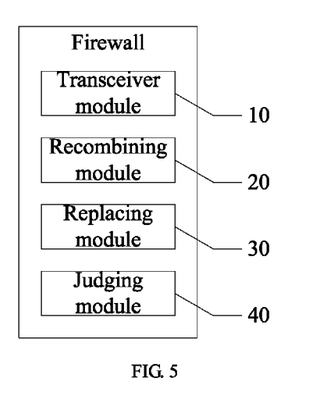
FIG. 5 is a schematic view of a firewall for defending against session hijacking attacks in accordance with a second embodiment of the present disclosure.

Referring to FIG. 5, which is a schematic view of a firewall for defending against session hijacking attacks in accordance with a second embodiment of the present Based on the firewall of the embodiment shown in FIG. 4, a judging module 40 is added in the firewall of the second embodiment shown in FIG. 5.

In the embodiment, the transceiver module 10 is further configured for receiving a second access request transmitted from a current client side, wherein the second access request includes the second authentication token.

The recombining module 20 is further configured for separating the first authentication token and the first sequence value from the second authentication token, and generating a second sequence value according to a network address and an identification code of the current client side.

The judging module 40 is configured for determining that the current client side is the legal client side if the second sequence value is the same as the first sequence value.

The replacing module 30 is further configured for replacing the second authentication token in the second access request with the first authentication token.

The transceiver module 10 is further configured for transmitting the second access request including the first authentication token to the server such that the server can validate the first authentication token and respond to the second access request.

The recombining module 20 is further specifically configured for generating the second sequence value from the network address and the identification code of the current client side using the same random string and Hash algorithm used for generating the first sequence value.

The current client side that transmits the second access request may be the legal client side initiating the access request again or an illegal client side stealing the token, thus, the second access request includes the second authentication token. The second authentication token can be separated into two parts, a part of which is the same as the first authentication token and the other part is the same as the first sequence value. The two parts can be used as the identification for validating the client side. The firewall obtains the information of the current client side and generates the second sequence value for validating whether the current client side is legal or not. The second sequence value can be generated in the same way as the first sequence value. The second sequence value can be generated from the network address and the identification code of the current client side using the same random string and Hash algorithm used for generating the first sequence value. If the current client side is the legal client side that initiates the access request again, the information of the current client side is the same as that of the legal client side, and the generated second sequence value is also the same as the first sequence value. If the current client side is an illegal client side that steals the token, the information of the illegal client side is apparently different from that of the legal client side, and the generated second sequence value is also different from the first sequence value. Thus, whether the current client side is legal or not can be determined through the step. After determining that the current client side is the legal client side, the firewall restores the second authentication token to the first authentication token and transmits the first authentication token to the server for validation.

With the validation of the identification of the client side of the embodiment, the firewall releases the current client side if the information of the current client side is the same as that of the legal client side, which effectively defends against various kinds of session hijacking attacks and avoids false reports or missing reports even if the token is changed, and thereby providing a more comprehensive and reliable defense.

Figure 6:
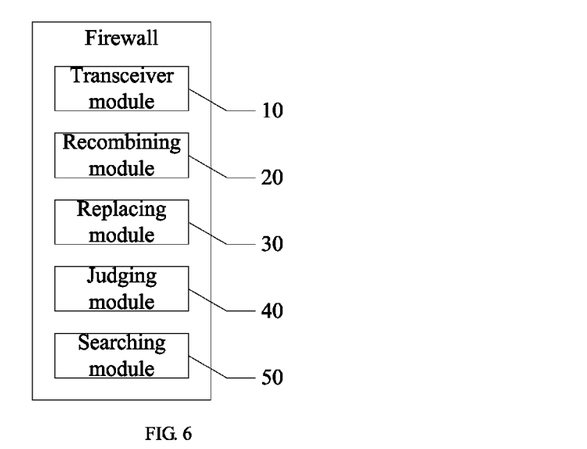
FIG. 6 is a schematic view of a firewall for defending against session hijacking attacks in accordance with a third embodiment of the present disclosure.

Referring to FIG. 6, which is a schematic view of a firewall for defending against session hijacking attacks in accordance with a third embodiment of the present disclosure. Based on the embodiment shown in FIG. 5, a searching module 50 is added in the firewall of the third embodiment.

The searching module 50 is further configured for searching a page relying on a token for access.

The recombining module 20 is further configured for obtaining Cookie data in multiple access requests and Set-Cookie data in multiple responses in a predetermined time, obtaining a key-value pair of each Cookie data and a key-value pair of each Set-Cookie data, and generating a corresponding third access request according to each key-value pair and each combination of the corresponding key-value pair.

The transceiver module 10 is further configured for accessing the page using each third access request respectively and receiving each third response returned from the page corresponding to each third access request.

The judging module 40 is configured for finding out a valid third response and determining that the key-value pair corresponding to the valid third response is the position where the first authentication token is stored.

In the embodiment, searching a page relying on a token for access means searching a page which can only be accessed after the login authentication is passed. The page relaying on a token for access can be determined via a configuration interface provided to a manager, or can be determined via a scanning function of the firewall before deploying the firewall, or can be determined by detecting the login request and response in real time. In the embodiment, the page can be determined by detecting the login request and response in real time. After the firewall is deployed, in an enough long predetermined time, all received requests messages and all received response messages are detected to obtain as many as samples as possible, for example, to obtain the samples from the Cookie data of request headers or from the Set-Cookie data of response headers. A part of the key-value pairs or all of the key-value pairs of the Cookie data and the Set-Cookie data are obtained. When the third access request message is generated, the header of the cookie message of the third access request message is modified to be one of the key-value pairs or one of the combinations of the corresponding key-value pair, that is, a user-defined access request, until all the combinations of the corresponding key-value pair are traversed. The firewall judges whether a token is included in the Cookie of the transmitted third access request or not according to the response of the server, based on distinguishable indexes such as a length of the message or a key word, etc. If the length of the message is equal to that of the correctly responded page, it means that a token is included in the key-value pair of the Cookie or the combination of the corresponding key-value pair in the third access request, and thus the corresponding key-value pair or the corresponding combination is recorded. If there are multiple valid positions, the simplest one is searched in order to determine a simplest position for storing the session token. In the present disclosure, the storing position of the token is determined by a self-learning function of the firewall, allowing the authentication token to be obtained accurately in the access request and avoiding the situation where that the token is obtained by mistake.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A method for defending against session hijacking attacks, applied in a computer hardware, comprising:
receiving a first access request transmitted from a legal client side and transmitting the first access request to a server;
receiving a first response comprising a first authentication token returned from the server;

generating a first sequence value according to a network address of the legal client side and an identification code of the legal client side, and recombining the first authentication token and the first sequence value to form a second authentication token;

replacing the first authentication token in the first response with the second authentication token, and transmitting the first response comprising the second authentication token to the legal client side;

receiving a second access request comprising the second authentication token transmitted from a current client side;

separating the first authentication token and the first sequence value from the second authentication token;

generating a second sequence value according to a network address of the current client side and an identification code of the current client side;

determining that the current client side is the legal client side if the second sequence value is the same as the first sequence value;

replacing the second authentication token in the second access request with the first authentication token; and transmitting the second access request comprising the first authentication token to the server such that the server can validate the first authentication token and respond to the second access request;

wherein the step of generating a first sequence value according to a network address of the legal client side and an identification code of the legal client side comprises:

generating the first sequence value from the network address of the legal client side and the identification code of the legal client side using a random string and Hash algorithm.

2. The method for defending against session hijacking attacks of claim 1, wherein the step of generating a second sequence value according to a network address of the current client side and an identification code of the current client side comprises:

generating the second sequence value from the network address of the current client side and the identification code of the current client side using the same random string and Hash algorithm used for generating the first sequence value.

3. The method for defending against session hijacking attacks of claim 1 further comprising the following steps before the step of receiving a first access request transmitted from a legal client side:

searching a page relying on authentication tokens for access in the server;

obtaining Cookie data in multiple access requests and Set-Cookie data in multiple responses in a predetermined time;

obtaining a key-value pair of each of the Cookie data and a key-value pair of each of the Set-Cookie data;

generating a corresponding third access request according to each of the key-value pair and each combination of the corresponding key-value pair;

accessing the page using each of the third access request respectively;

receiving a third response returned from the page corresponding to each of the third access request; and if the third response is valid, determining that the key-value pair corresponding to the valid third response corresponds to a position where the first authentication token is stored.

4. The method for defending against session hijacking attacks of claim 2 further comprising the following steps before the step of receiving a first access request transmitted from a legal client side:

searching a page relying on authentication tokens for access in the server;

obtaining Cookie data in multiple access requests and Set-Cookie data in multiple responses in a predetermined time;

obtaining a key-value pair of each of the Cookie data and a key-value pair of each of the Set-Cookie data;

generating a corresponding third access request according to each of the key-value pair and each combination of the corresponding key-value pair;

accessing the page using each of the third access request respectively;

receiving a third response returned from the page corresponding to each of the third access request; and if the third response is valid, determining that the key-value pair corresponding to the valid third response corresponds to a position where the first authentication token is stored.

5. A firewall for defending against session hijacking attacks, comprising one or more programs stored in a storage system and executed by at least one hardware processor, the one or more programs comprising:

a transceiver module configured for receiving a first access request transmitted from a legal client side, transmitting the first access request to a server, and receiving a first response comprising a first authentication token returned from the server;

a recombining module configured for generating a first sequence value according to a network address of the legal client side and an identification code of the legal client side and recombining the first authentication token and the first sequence value; and a replacing module configured for replacing the first authentication token in the first response with the second authentication token;

the transceiver module being further configured for transmitting the first response comprising the second authentication token to the legal client side;

the transceiver module is further configured for receiving a second access request comprising the second authentication token transmitted from a current client side;

the recombining module is further configured for separating the first authentication token and the first sequence value from the second authentication token and generating a second sequence value according to a network address of the current client side and an identification code of the current client side;

the firewall further comprises a judging module; the judging module is configured for determining that the current client side is the legal client side if the second sequence value is the same as the first sequence value;

the replacing module is further configured for replacing the second authentication token in the second access request with the first authentication token; and the transceiver module is further configured for transmitting the second access request comprising the first authentication token to the server such that the sever can validate the first authentication token and respond to the second access request;

wherein the recombining module is configured for generating the first sequence value from the network address of the legal client side and the identification code of the legal client side using a random string and Hash algorithm.

6. The firewall for defending against session hijacking attacks of claim 5, wherein the recombining module is further configured for generating the second sequence value from the network address of the current client side and the identification code of the current client side using the same random string and Hash algorithm used for generating the first sequence value.

7. The firewall for defending against session hijacking attacks of claim 5 further comprising a searching module for searching a page relying on authentication tokens for access in the server;
the recombining module is configured for obtaining Cookie data in multiple access requests and Set-Cookie data in multiple responses in a predetermined time, obtaining a key-value pair of each of the Cookie data and a key-value pair of each of the Set-Cookie data, and generating a corresponding third access request according to each of the key-value pair and each combination of the corresponding key-value pair;
the transceiver module is further configured for accessing the page using each of the third access request respectively and receiving a third response returned from the page corresponding to each of the third access request; and
the judging module is further configured for finding out a valid third response and determining that the key-value pair corresponding to the valid third response corresponds to a position where the first authentication token is stored.

8. The firewall for defending against session hijacking attacks of claim 6 further comprising a searching module for searching a page relying on authentication tokens for access in the server;
the recombining module is configured for obtaining Cookie data in multiple access requests and Set-Cookie data in multiple responses in a predetermined time, obtaining a key-value pair of each of the Cookie data and a key-value pair of each of the Set-Cookie data, and generating a corresponding third access request according to each of the key-value pair and each combination of the corresponding key-value pair;
the transceiver module is further configured for accessing the page using each of the third access request respectively and receiving a third response returned from the page corresponding to each of the third access request; and
the judging module is further configured for finding out a valid third response and determining that the key-value pair corresponding to the valid third response corresponds to a position where the first authentication token is stored.

* * * * *